United States Patent
Kondou et al.

(10) Patent No.: US 9,438,090 B2
(45) Date of Patent: Sep. 6, 2016

(54) METHOD OF ASSEMBLING A ROTARY ELECTRIC MACHINE

(71) Applicant: DAIKIN INDUSTRIES, LTD., Osaka-shi, Osaka (JP)

(72) Inventors: Toshinari Kondou, Kusatsu (JP); Yoshiki Yasuda, Kusatsu (JP); Akio Yamagiwa, Kusatsu (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 14/603,771

(22) Filed: Jan. 23, 2015

(65) Prior Publication Data

US 2015/0135519 A1    May 21, 2015

Related U.S. Application Data

(63) Continuation of application No. 13/638,041, filed as application No. PCT/JP2011/001838 on Mar. 28, 2011, now abandoned.

(30) Foreign Application Priority Data

Mar. 31, 2010 (JP) ................. 2010-080760

(51) Int. Cl.

| | |
|---|---|
| *H02K 15/02* | (2006.01) |
| *H02K 15/10* | (2006.01) |
| *H02K 1/16* | (2006.01) |
| *H02K 1/27* | (2006.01) |
| *H02K 3/50* | (2006.01) |
| *H02K 21/14* | (2006.01) |

(52) U.S. Cl.
CPC ............. *H02K 15/026* (2013.01); *H02K 1/16* (2013.01); *H02K 1/276* (2013.01); *H02K 3/50* (2013.01); *H02K 21/14* (2013.01); *H02K 2201/03* (2013.01); *Y10T 29/49012* (2015.01)

(58) Field of Classification Search
CPC ...... H02K 3/522; H02K 1/148; H02K 21/16; H02K 1/14; H02K 1/24; Y10T 29/49009; Y10T 29/49012; Y10T 29/49073
USPC ............ 29/598, 596, 605, 606; 310/91, 114, 310/166, 180, 194, 266
See application file for complete search history.

(56) References Cited

U.S. PATENT DOCUMENTS

| | | | |
|---|---|---|---|
| 4,683,391 A | 7/1987 | Higuchi | |
| 4,968,911 A | 11/1990 | Denk | |
| 5,485,046 A * | 1/1996 | Kaplan | H02K 19/103 310/114 |
| 5,567,999 A * | 10/1996 | Baronosky | H02K 19/103 310/194 |
| 2010/0289374 A1 | 11/2010 | Koga et al. | |

FOREIGN PATENT DOCUMENTS

| | | |
|---|---|---|
| JP | 11-289726 A | 10/1999 |
| JP | 2005-012974 A | 1/2005 |
| JP | 2009-189078 A | 8/2009 |
| JP | 2009-273216 A | 11/2009 |
| WO | WO 2010/007950 A1 | 1/2010 |

* cited by examiner

*Primary Examiner* — Thiem Phan (74) *Attorney, Agent, or Firm* — Birch, Stewart, Kolasch & Birch, LLP (57) ABSTRACT

A motor includes a driving shaft, a rotor attached to the driving shaft, and a stator having a substantially cylindrical stator core provided around the rotor, and a plurality of coils wound around the stator core in a distributed winding manner. The stator core includes three separated stator core parts aligned along a peripheral direction, and each of the coils is disposed so as not to lie astride any two of the three separated stator core parts. At least one coil end of the plurality of the coils is disposed to pass through an inner side relative to an inner peripheral surface of the stator core.

3 Claims, 7 Drawing Sheets

METHOD OF ASSEMBLING A ROTARY ELECTRIC MACHINE

CROSS-REFERENCE PARAGRAPH

This application is a Continuation of U.S. application Ser. No. 13/638,041, filed on Sep. 28, 2012. U.S. application Ser. No. 13/638,041 is the National Phase under 35 U.S.C. §371 of International Application No. PCT/JP2011/001838 filed on Mar. 28, 2011, which claims priority under 35 U.S.C. 119(a) on Patent Application No. 2010-080760, filed in Japan on Mar. 31, 2010, the contents of each of the aforementioned applications being hereby expressly incorporated by reference into the present application in their entirety.

TECHNICAL FIELD

The present invention relates to rotary electric machines, such as motors having distributed winding coils etc., and particularly relates to achieving miniaturization of such machines.

BACKGROUND ART

Rotary electric machines, such as a motor, etc., include a rotary electric machine of a so-called distributed winding type in which coils are wound so as to lie astride a plurality of teeth of a stator core (for example, see the following Patent Document 1). In the rotary electric machine of such a type, a stator and a rotor are generally assembled by axially inserting the rotor into the inner peripheral side of a stator core. At this time, coil ends of each coil are formed to be curved toward an outer peripheral side of the stator core so as not to hit the rotor.

CITATION LIST

Patent Document

PATENT DOCUMENT 1: Japanese Patent Publication No. 2005-12974

SUMMARY OF THE INVENTION

Technical Problem

However, as stated above, if the coil ends of each coil are formed to be curved toward the outer peripheral side, the coil ends not contributing to the occurrence of torque become longer. As a result, an electric resistance in each coil becomes higher, resulting in reduced efficiency of the rotary electric machine due to copper loss.

In view of the above problem, the present invention has been developed. It is an object of the present invention to, in a rotary electric machine of a distributed winding type, prevent hitting between a coil end and a rotor when the rotor and a stator are assembled while shortening the coil end to improve efficiency of the rotary electric machine.

Solution to the Problem

A first aspect of the invention is directed to a rotary electric machine including: a driving shaft (60); a driving shaft (60); a rotor (40) having a substantially cylindrical rotor core (41) attached to the driving shaft (60); and a stator (20) having a substantially cylindrical stator core (30) provided around the rotor (40), and a plurality of coils (21, 22, 23) wound around the stator core (30) in a distributed winding manner, wherein the stator core (30) includes a plurality of members (31) aligned along a peripheral direction, each of the coils (21, 22, 23) is disposed so as not to lie astride any two of the plurality of the members (31), and a coil end (21E) of at least one of the plurality of the coils (21, 22, 23) is disposed to pass through an inner side relative to an inner peripheral surface of the stator core (30).

According to the first aspect of the invention, a coil end (21E) of at least one of the coils (21, 22, 23) is disposed to pass through the inner side relative to the inner peripheral surface of the stator core (30), and therefore, the coil end (21E) can be formed shorter than a coil end formed to be curved toward the outer peripheral surface of the stator core (30). A region located in the inner side relative to the inner peripheral surface of the stator core (30) is used as a region for arranging the coil ends (21E, 22E, 23E), thereby distributing, along the radial direction, the coil ends (21E, 22E, 23E) arranged in the same angle without laminating them along the axial direction. Such a configuration prevents the coil ends (21E, 22E, 23E) from abutting one another.

According to the first aspect of the invention, the stator core (30) includes the plurality of the members (31) aligned along the peripheral direction, and each of the coils (21, 22, 23) is disposed so as not to lie astride any two of the plurality of the members (31). Therefore, each of the members (31) of the stator core (30) in which the coils (21, 22, 23) are wound are radially inwardly attached from the outer peripheral side of the rotor (40) to be able to assemble the stator (20) and the rotor (40). Therefore, even if the coil end (21E, 22E, 23E) passes through the inner side relative to the inner peripheral surface of the stator core (30), it is possible to prevent the coil end (21E) from hitting the rotor (40) when the stator (20) and the rotor (40) are assembled.

In a second aspect of the invention related to the first aspect of the invention, a coil end (21E, 22E, 23E) of at least one of the plurality of the coils (21, 22, 23) is formed in a linear shape when viewed in plan.

According to the second aspect of the invention, a coil end (21E, 22E, 23E) of at least one of the plurality of the coils (21, 22, 23) is formed in a linear shape when viewed in plan. In other words, the coil end (22E) is formed by connecting both ends thereof together by the shortest distance in an axial end surface of the stator core (30). If the coil end (22E) is formed as stated above, the coil end (22E) may pass through the inner side relative to the inner peripheral surface of the stator core (30). However, since the stator core (30) includes the plurality of the members (31) as stated above, the coil end (22E) does not hit the rotor (40) when the stator (20) and the rotor (40) are assembled.

In a third aspect of the invention related to the first or second aspect of the invention, the stator core (30) has raised/recessed portions (38), and the rotor core (41) has raised/recessed portions (46) to face the raised/recessed portions (38) so that gaps (G) are formed between the stator core (30) and the rotor core (41) to be continuously arranged in a staggered manner along a radial direction and an axial direction.

According to the third aspect of the invention, the gaps (G) are formed between the stator core (30) and the rotor core (41) to be continuously arranged in a staggered manner along the radial direction and the axial direction. With such a configuration, the stator core (30) and the rotor core (41) have parts of surfaces facing each other not only in the radial direction but also in the axial direction, thereby drastically increasing areas where the parts of the surfaces of the both cores face each other. This configuration improves torque characteristics in the rotary electric machine.

Advantages of the Invention

According to the first aspect of the invention, hitting between the coil ends (21E, 22E, 23E) and the rotor (40) can be prevented when the rotor and a stator are assembled while the coil ends (21E, 22E, 23E) can be shortened. As a result, an electric resistance in the coil ends (21E, 22E, 23E) can be reduced to be able to prevent reduced efficiency of the rotary electric machine due to copper loss. A region located in the inner side relative to the inner peripheral surface of the stator core (30) is used as a region for arranging the coil ends (21E, 22E, 23E), thereby making it possible to distribute, along the radial direction, the coil ends (21E, 22E, 23E) arranged in the same angle without laminating them along the axial direction. As a result, the heights of the coil ends (21E, 22E, 23E) in the axial direction can be suppressed, and the use of the region located in the inner side relative to the inner peripheral surface of the stator core (30), which could not conventionally be used, can prevent the coil ends (21E, 22E, 23E) from expanding toward the outer peripheral side, thereby making it possible to reduce the length of the stator core (30) in the radial direction. Therefore, the rotary electric machine is miniaturized, and the coil ends (21E, 22E, 23E) are further shortened, thereby making it possible to improve efficiency of the rotary electric machine.

According to the second aspect of the invention, the coil end (22E) is formed by connecting both ends thereof together by the shortest distance in an axial end surface of the stator core (30), thereby making it possible to further shorten the coil end (22E) to prevent reduced efficiency of the rotary electric machine due to copper loss.

According to the third aspect of the invention, areas where the part of the surface of the stator core (30) and the part of the surface of the rotor core (41) face each other is drastically increased, thereby making it possible to improve torque characteristics in the rotary electric machine to improve the efficiency of the rotary electric machine.

If the stator core (30) is provided with the raised/recessed portions (38), and the rotor core (41) is provided with the raised/recessed portions (46), the size of the rotary electric machine itself increases in the radial direction. However, as stated above, the use of the region located in the inner side relative to the inner peripheral surface of the stator core (30) prevents the coil ends (21E, 22E, 23E) from expanding toward the outer peripheral side, thereby making it possible to reduce the length of the stator core (30) in the radial direction. Therefore, the efficiency of the rotary electric machine can be improved without an increase in the size of the rotary electric machine.

DESCRIPTION OF EMBODIMENTS

An embodiment of the present disclosure will be described in detail below with reference to the drawings.

Embodiments of Invention

Overview

Figure 1:
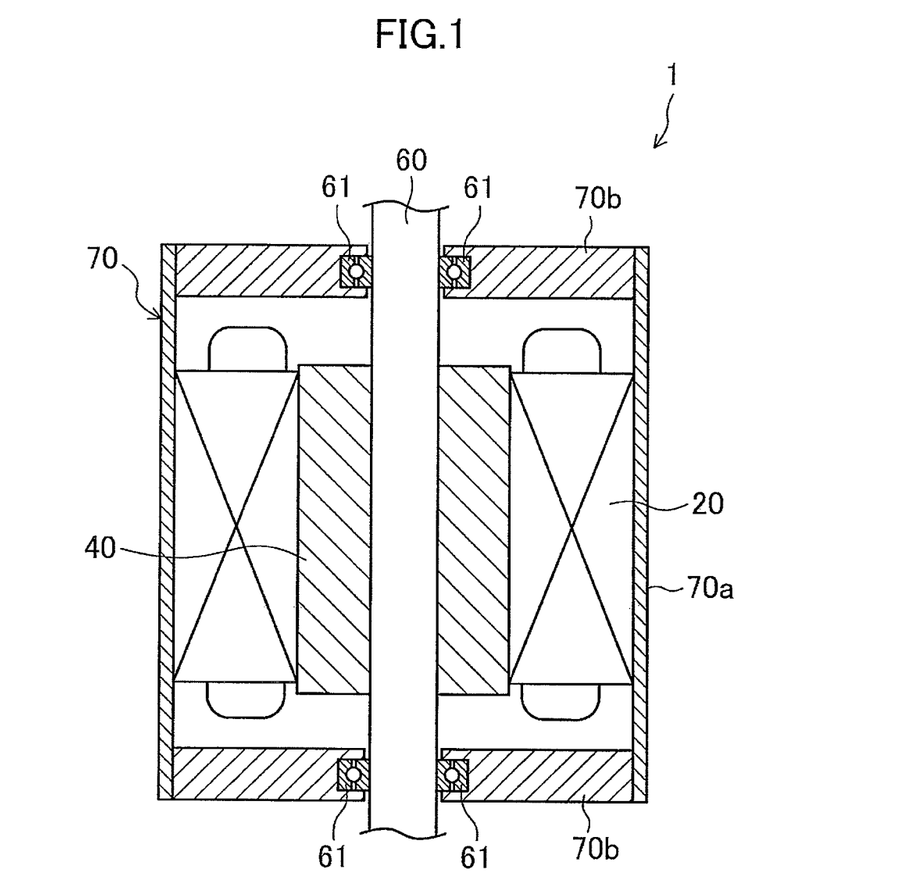
FIG. 1 is a longitudinal sectional view schematically showing a structure of a motor according to an embodiment of the present invention.

FIG. 1 is a longitudinal sectional view schematically showing a structure of a motor (1) according to an embodiment of the present invention. The motor (1) includes a stator (20), a rotor (40), and a driving shaft (60), and these elements are accommodated in a casing (70). The motor (1) is a so-called interior permanent magnet (IPM) motor.

The casing (70) has a cylinder portion (70a) having a cylindrical shape, and an end plate (70b) closing both ends of the cylinder portion (70a) and rotatably supporting the driving shaft (60). The cylinder portion (70a) has a separate structure where each element has an angle of 120 degrees as well as a stator core (30) described later. The driving shaft (60) is rotatably supported by the end plate (70b) through a bearing (61).

In the following descriptions, the term "axial direction" or "axially" refers to a direction of a shaft center of the driving shaft (60), and the term "radial direction" or "radially" refers to a direction orthogonal to the direction of the shaft center. The term "outer peripheral side" refers to a side further from the shaft center, and the term "inner peripheral side" refers to a side closer to the shaft center. A lamination position refers to a position of each of lamination plates in the axial direction described later.

Stator (20)

Figure 2:
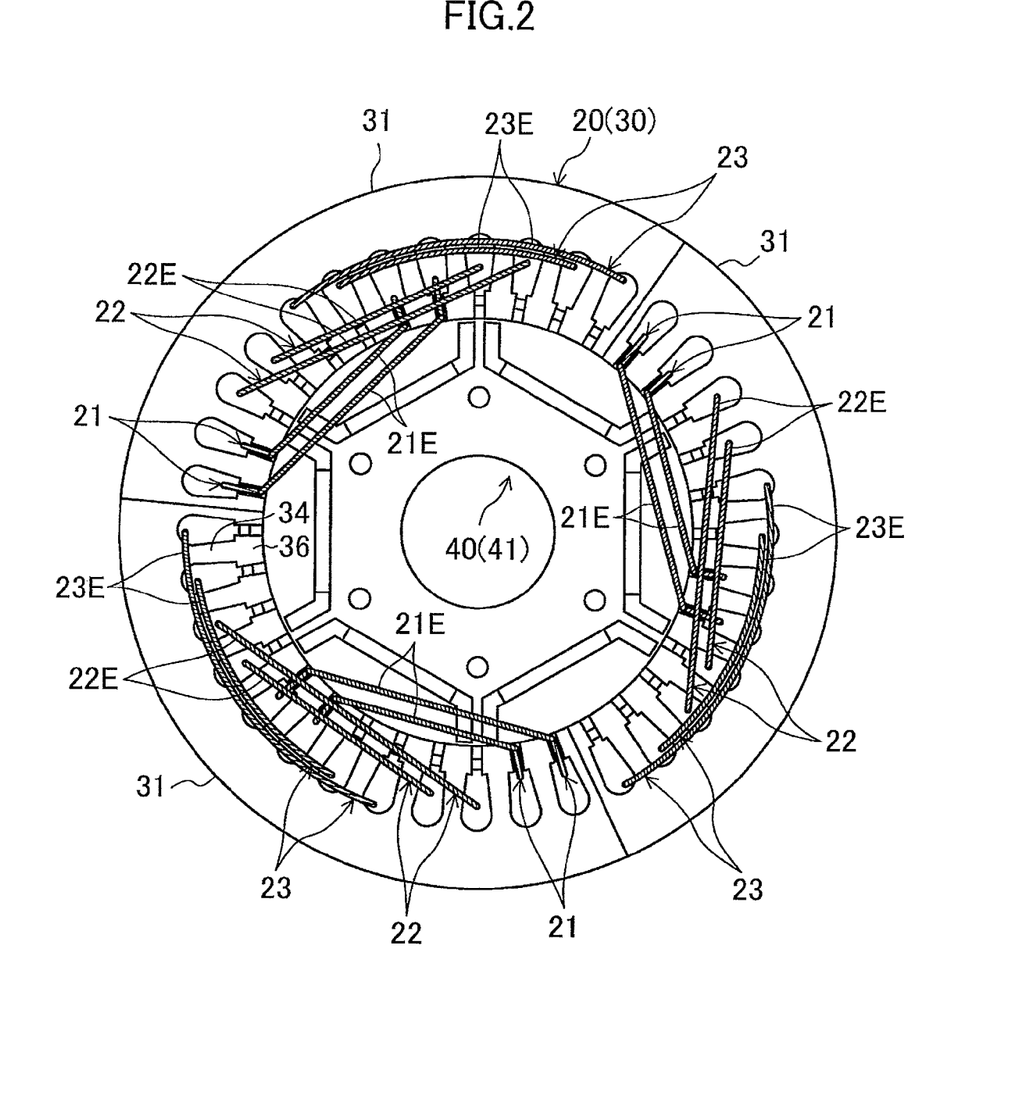
FIG. 2 is a plan view showing the structure of the motor in the embodiment.
Figure 3:
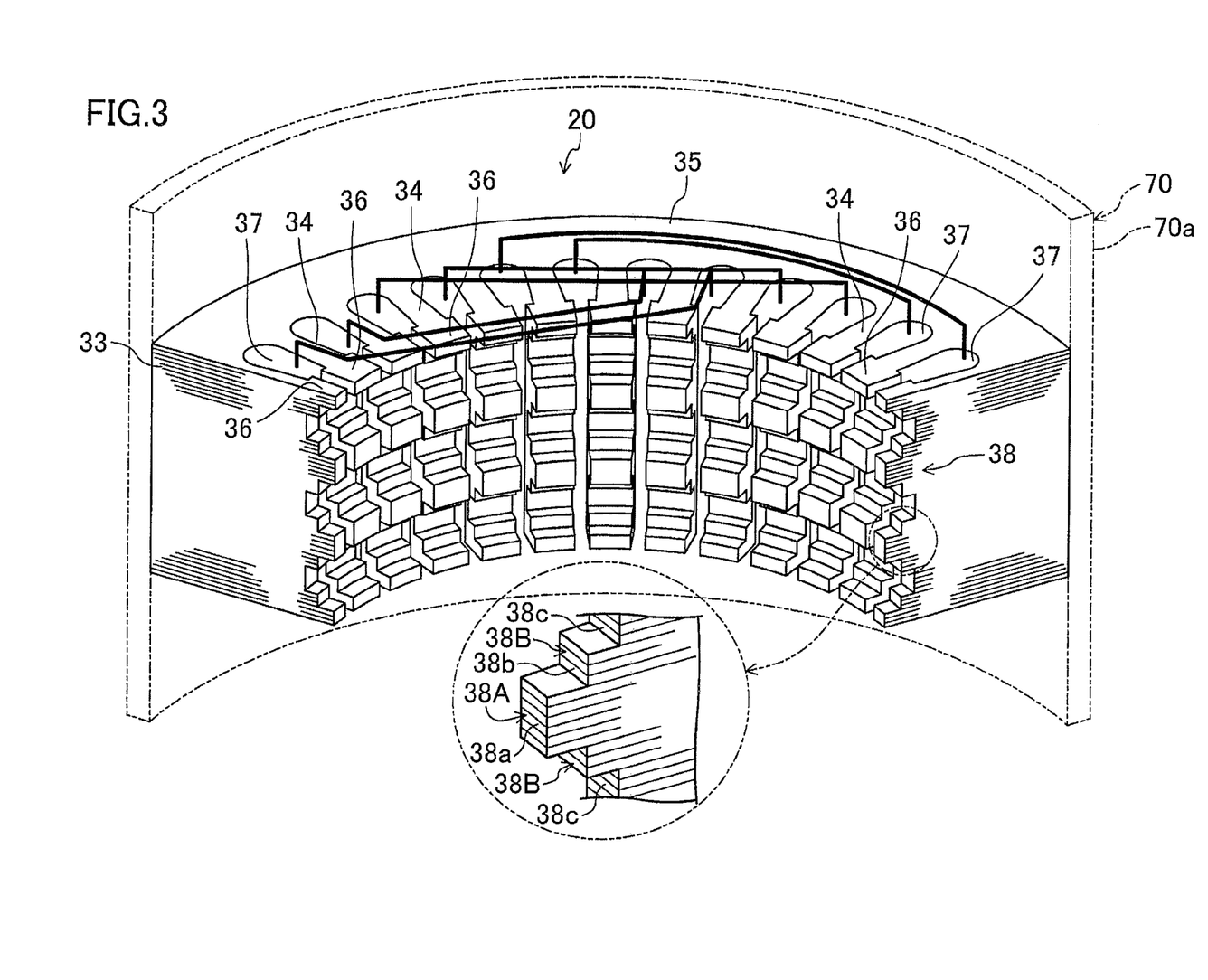
FIG. 3 is a perspective view showing a structure of a stator core part.

As shown in FIG. 2, the stator (20) includes a stator core (30), and coils (21, 22, 23) arranged by winding conducting wires a plurality of times in a substantially rectangular form. As shown in FIG. 3, the stator core (30) is a lamination core formed by laminating a plurality of electromagnetic steel plates (lamination plates) along the axial direction.

The stator core (30) includes, as shown in FIG. 2, a core back portion (35) having a substantially cylindrical shape, and a plurality of teeth (34) radially inwardly protruding from the core back portion (35). The stator core (30) is constituted by a plurality of members aligned along a peripheral direction. Specifically, in the embodiment, the stator core (30) includes three separated arc-shaped stator core parts (31) each having an angel of 120 degrees. The three separated stator core parts (31) are arranged such that end surfaces of adjoining ones of the stator core parts (31) along the peripheral direction abut each other. The cylinder portion (70a) of the casing (70) constituted by a plurality of separated parts as well as the separated stator core parts (31) is fixed so that the plurality of the parts are fixed to the respective outer peripheral surfaces of the three separated stator core parts (31) by welding, etc., which will be described later.

36 teeth (34) are provided in the embodiment, and the same number of spaces as that of the teeth are formed among the respective teeth (34). The space constitutes a coil slot (37) accommodating the coils (21, 22, 23). Specifically, one stator core part (31) is provided with 12 coil slots (37).

A tip of each of the teeth (34) is a tooth tip (36) which has a quadrilateral shape when viewed in plan, and which is wider in the peripheral direction than the body of the tooth (34) located at a proximal end side (a side closer to the core back portion (35)). As shown in FIG. 3, each of the tooth tips (36) is formed so that radially inner end surfaces of the tooth tip has raised/recessed portions in the cross section taken along the axial direction. The raised/recessed portions of each of the tooth tips (36) is hereinafter referred to as stator side raised/recessed portions (38), and of radially inner end surfaces of the stator side raised/recessed portions (38), the outermost surface is referred to as a bottom surface, and other surfaces are referred to as a top surface. Specifically, the stator side raised/recessed portions (38) include a first top surface (38a), a second top surface (38b), and a bottom surface (38c).

The stator side raised/recessed portions (38) can be formed by changing radial lengths (tooth tip lengths) of the lamination plates (33) constituting the tooth tips (36) depending on the lamination position of the lamination plate (33). Specifically, a first raised portion (38A) is formed by the inner ends of the plurality of the lamination plates (33) (the ends located inside relative to the second top surface (38b)) having the same length along the radial direction, and forming the first top surface (38a). A second raised portion (38B) is formed by the inner ends of the plurality of the lamination plates (33) (the ends located inside relative to the bottom surface (38c)) having the same length along the radial direction, and forming the second top surface (38b).

As shown in FIG. 2, each of the stator core parts (31) includes 6 coils (21, 22, 23), and thus, 18 coils are provided in total in the embodiment, and the coils are wound in a so-called distributed winding manner. The coils (21, 22, 23) are wound so that each of the coils lies on the plurality of the teeth (34).

Specifically, the stator (20) includes U-phase coils (21), V-phase coils (22), and W-phase coils (23). In the embodiment, 6 U-phase coils (21), 6 V-phase coils (22), and 6 W-phase coils (23) are provided, and each of the stator core parts (31) includes 2 U-phase coils (21), 2 V-phase coils (22), and 2 W-phase coils (23). A predetermined electric power is supplied to each of the coils (21, 22, 23), thereby making it possible to generate a rotating magnetic field in the stator (20). Each of the coils (21, 22, 23) respectively has coil ends (21E, 22E, 23E) each protruding from an axial end surface of the stator core (30) toward the axial direction. The arrangement of the coil ends (21E, 22E, 23E) of the coils (21, 22, 23) will be described later.

Rotor (40)

Figure 4:
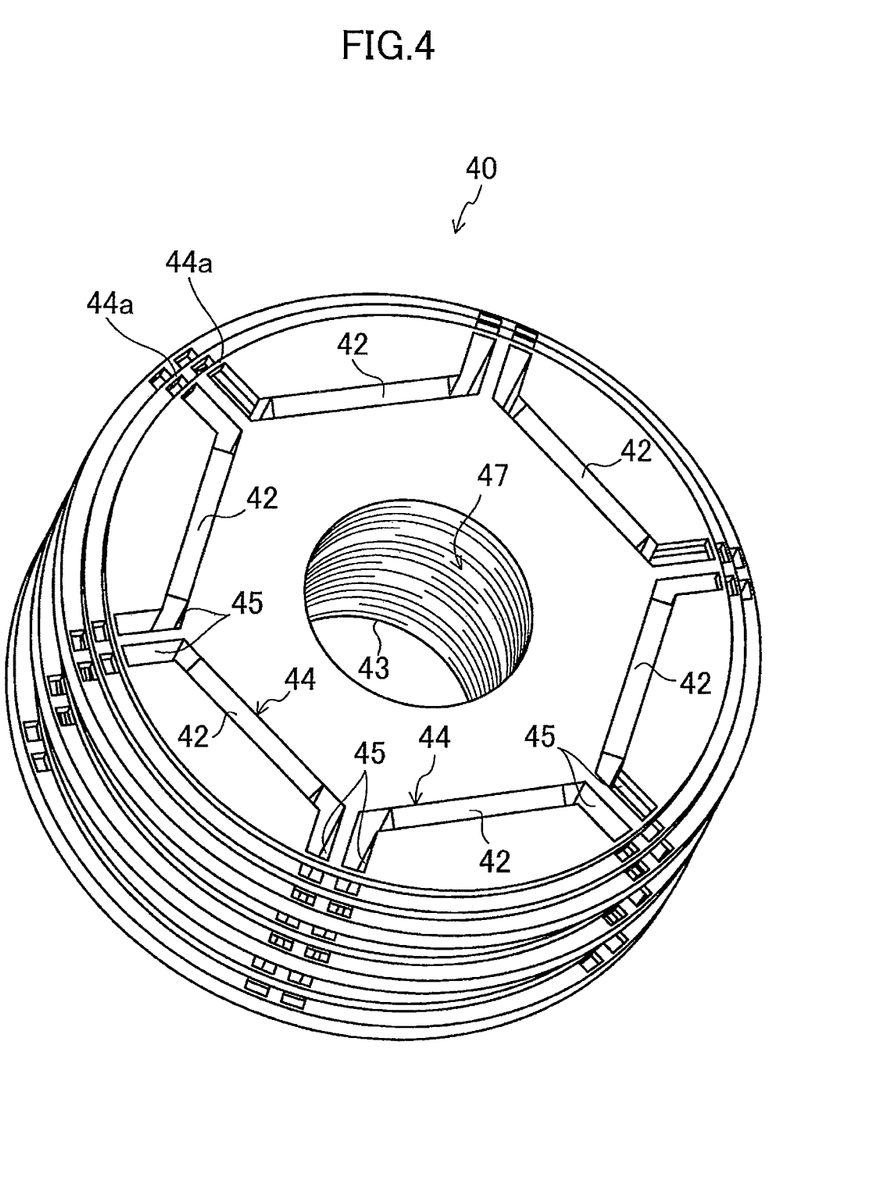
FIG. 4 is a perspective view of a rotor.

As shown in FIG. 4, the rotor (40) includes a rotor core (41), and a plurality of magnets (42). The rotor core (41) is a lamination core formed by laminating a plurality of electromagnetic steel plates (lamination plates (43)) along the axial direction, and has a cylindrical shape.

The center of the rotor core (41) has a shaft hole (47) for inserting the driving shaft (60) therein. The rotor core (41) is provided with a plurality of magnetic slots (44) each accommodating the corresponding one of the magnets (42). The magnetic slots (44) are arranged around the shaft center of the shaft hole (47) at 60 degree pitches. In other words, each of the magnetic slots (44) is provided in axial symmetry relative to the shaft center of the shaft hole (47). Each of the magnetic slots (44) is formed in a U shape when viewed in plan (seen along the axial direction), and axially penetrates the rotor core (41). Both ends of each of the magnetic slots (44) in the peripheral direction extend to the outer periphery of the rotor core (41). In the rotor core (41), a part constituting the end of the magnetic slot (44) in the peripheral direction (a thin part at the outer periphery, see FIG. 4) is referred to as a bridge portion (44a).

The magnets (42) are held around the center of the magnetic slot (44). The total length of the magnet (42) is shorter than that of the magnetic slot (44), and a space (45) is formed in each of both ends of the magnetic slot (44) in the peripheral direction with the magnet (42) being accommodated.

Figure 5:
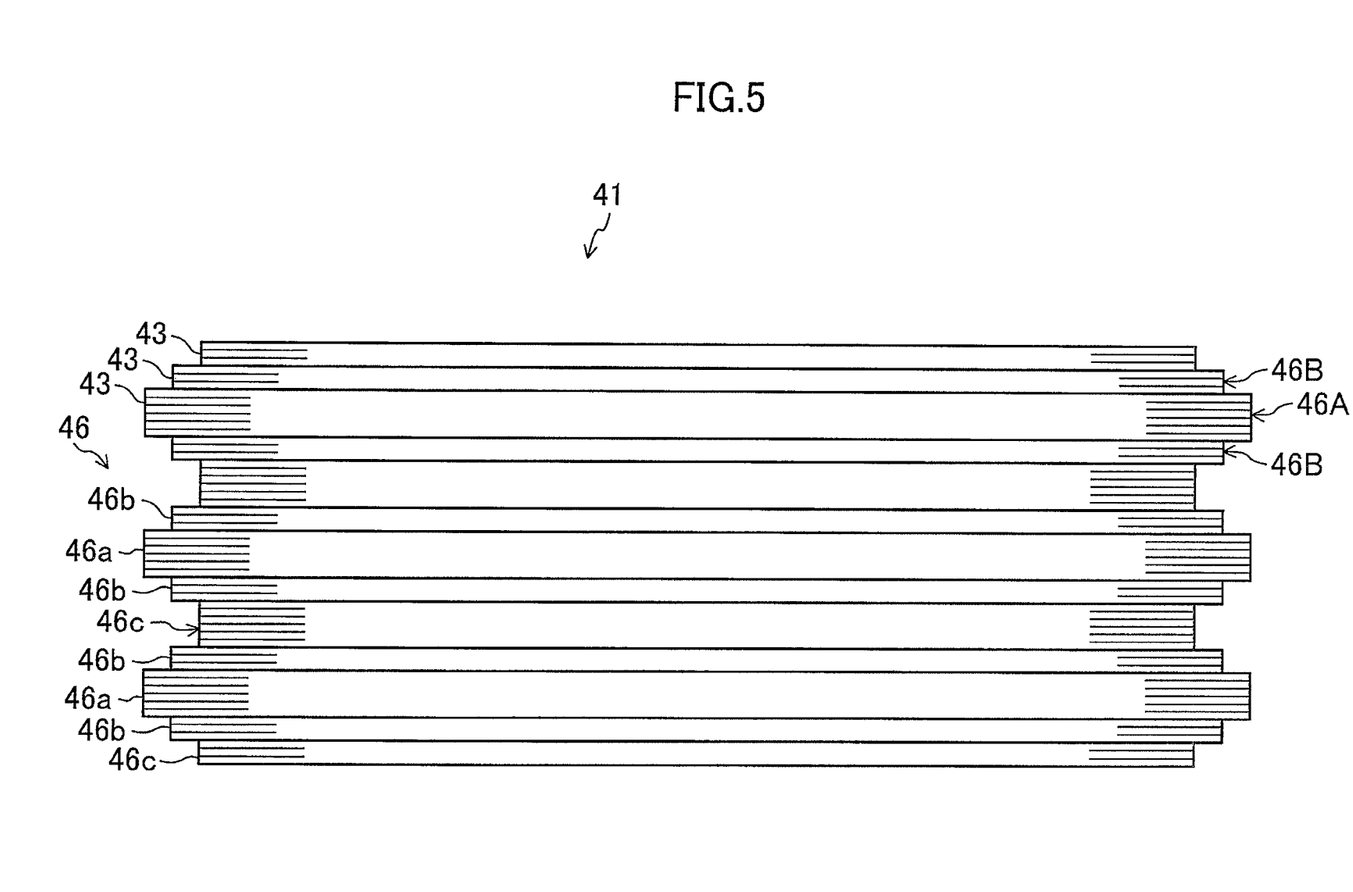
FIG. 5 is a side view of a rotor core.

As shown in FIG. 5, the rotor core (41) has radially outer end surfaces having raised/recessed portions in the cross section taken along the axial direction. The raised/recessed portions of the rotor core (41) is hereinafter referred to as rotor side raised/recessed portions (46), and of radially outer end surfaces of the rotor side raised/recessed portions (46), the innermost surface is referred to as a bottom surface, and other surfaces are referred to as a top surface. Specifically, the rotor side raised/recessed portions (46) include a first top surface (46a), a second top surface (46b), and a bottom surface (46c), as shown in FIG. 5.

The rotor side raised/recessed portions (46) can be formed by changing the diameter of the lamination plate (43) depending on the lamination position of the lamination plate (43). Specifically, a first raised portion (46A) is formed by the outer ends of the plurality of the lamination plates (43) (the ends located outside relative to the second top surface (46b)) having the same diameter, and forming the first top surface (46a). A second raised portion (46B) is formed by the outer ends of ends of the plurality of the lamination plates (43) (the ends located outside relative to the bottom surface (46c)) having the same diameter, and forming the first top surface (46b).

Three-Dimensional Gaps

Figure 6:
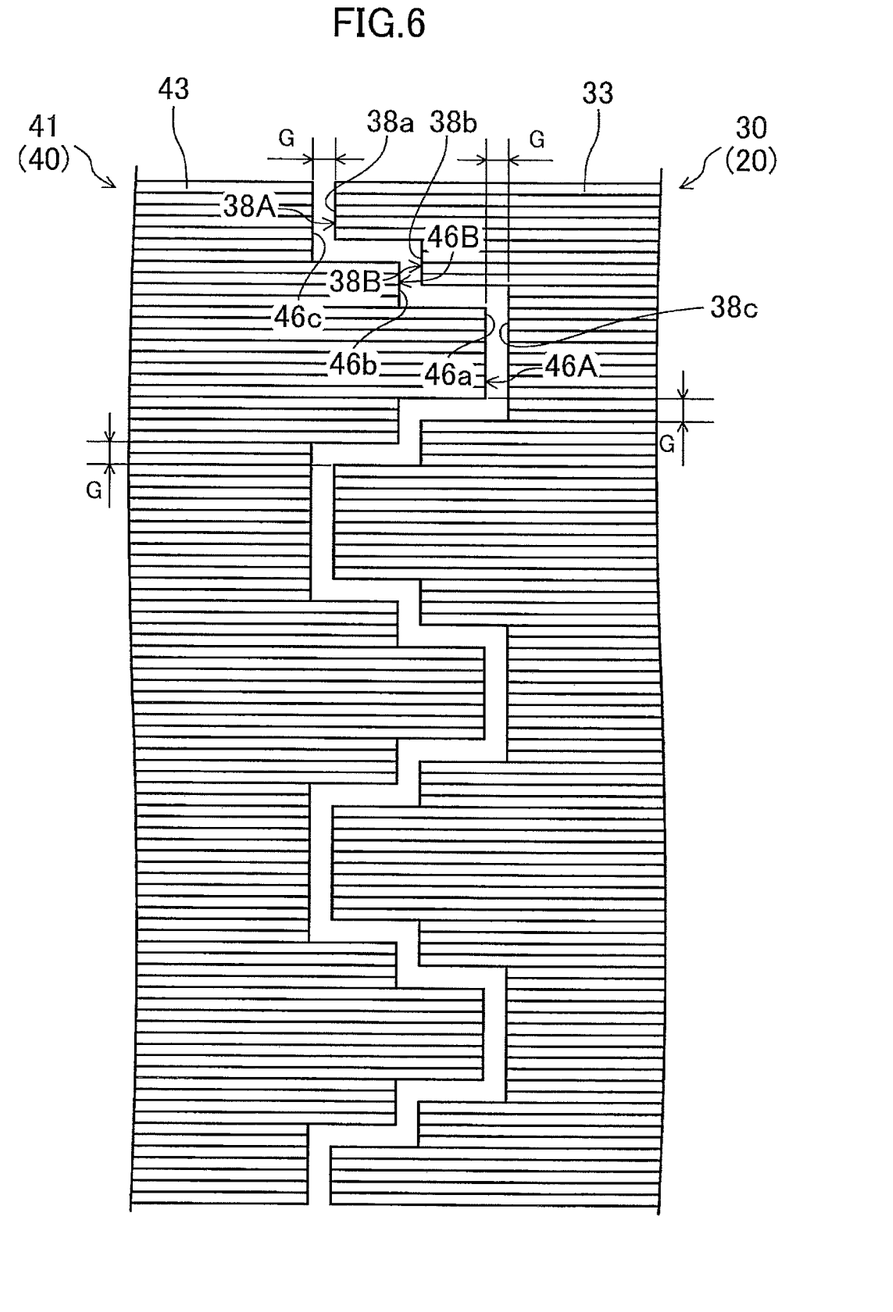
FIG. 6 is an enlarged longitudinal sectional view showing a portion formed by combining the rotor with a stator.

FIG. 6 is a cross-sectional view showing a state in which the stator (20) and the rotor (40) are combined with each other. As shown in FIG. 6, when the stator (20) and the rotor (40) are combined with each other, the stator core (30) and the rotor core (41) face each other along the radial direction and the axial direction through gaps (G) continuously arranged in a staggered manner along the radial direction and the axial direction. Specifically, regarding the radial direction, the first top surface (46a) of the first raised portion (46A) of the rotor side raised/recessed portions (46) faces the bottom surface (38c) of the stator side raised/recessed portions (38), the second top surface (46b) of the second raised portion (46B) of the rotor side raised/recessed portions (46) faces the second top surface (38b) of the second raised portion (38B) of the stator side raised/recessed portions (38), the bottom surface (46c) of the rotor side raised/recessed portions (46) faces the first top surface (38a) of the first raised portion (38A) of the stator side raised/recessed portions (38), and the gaps are formed between the respective surfaces along the axial direction. Regarding the axial direction, an axial end surface of the first raised portion (46A) of the rotor side raised/recessed portions (46) faces an axial end surface of the second raised portion (38B) of the stator side raised/recessed portions (38), an axial end surface of the second raised portion (46B) of the rotor side raised/recessed portions (46) faces an axial end surface of the first raised portion (38A) of the stator side raised/recessed portions (38), and the gaps are formed between the respective surfaces along the radial direction. With such a configuration, the stator side raised/recessed portions (38) and the rotor side raised/recessed portions (46) form the gaps (three-dimensional gaps) between the stator core (30) and the rotor core (41) to be continuously arranged in a staggered manner along the radial direction and the axial direction. In this example, the sizes of the gap (G) in the radial direction, and that in the axial direction are 0.3 mm.

Configuration of Coil Ends

As shown in FIGS. 2 and 3, in the embodiment, the coil ends (21E, 22E, 23E) of the respective coils (21, 22, 23) are arranged as follows.

The coil end (21E) of the U-phase coil (21) is radially inwardly inclined immediately after axially protruding from the axial end surface of the stator core (30), and is located at an inner side relative to the coil ends (22E, 23E) of the coils of the other phases (22, 23) in the radial direction. As shown in FIG. 2, the coil end (21E) of the U-phase coil (21) passes through the inner side relative to the inner peripheral surface of the stator core (30).

The coil end (22E) of the V-phase coil (22) axially protrudes from the axial end surface of the stator core (30). The coil end (22E) of the V-phase coil (22) is formed so as to connect the coil slots (37) accommodating the V-phase coil (22) together by the shortest distance, and is formed in a linear shape when viewed in plan.

The coil end (23E) of the W-phase coil (23) axially protrudes from the axial end surface of the stator core (30), and then is curved toward the peripheral direction of the stator core (30) without being inclined.

Method of Assembling Motor

First, each of the three parts of the cylinder portion (70a) of the casing (70) separately prepared is fixed to the corresponding one of the stator core parts (31) by welding etc (see FIG. 3). Then, each of the coils (21, 22, 23) is attached to the corresponding one of the stator core parts (31). The respective coils (21, 22, 23) are formed so that a conducting wire is wound a plurality of times in advance. The respective coils (21, 22, 23) are sequentially attached to lie astride the plurality of teeth (34).

At the same time of the above step, the rotor (40) is fixed to the driving shaft (60). Then, the driving shaft (60) is attached to the end plate (70b) of the casing (70).

Next, the rotor (40) and the stator core parts (31) to which the respective coils (21, 22, 23) are attached are assembled. Specifically, the respective stator core parts (31) are radially inwardly moved from the outer peripheral side of the rotor (40) to installation positions, and the parts of the cylinder portion (70a) of the casing (70) fixed to the respective stator core parts (31) are fixed to predetermined positions of the end plates (70b). At that time, the respective stator core parts (31) and the rotor (40) are assembled so that the gaps are formed between the stator core (30) and the rotor core (41) to be continuously arranged in a staggered manner along the radial direction and the axial direction. In this way, the motor (1) is assembled.

Advantages of Embodiment

In this way, the motor (1) is configured such that the stator core (30) is constituted by the three separated stator core parts (31) aligned along the peripheral direction, and the respective coils (21, 22, 23) are arranged so as not to lie astride any two of the three separated stator core parts (31). Therefore, the respective stator core parts (31) each in which the coils (21, 22, 23) are installed are radially inwardly moved from the outer peripheral side of the rotor (40) to be able to assemble the stator (20) and the rotor (40). Therefore, even if any of the coil ends (21E, 22E, 23E) passes through the inner side relative to the inner peripheral surface of the stator core (30), it is possible to prevent the coil ends (21E, 22E, 23E) from hitting the rotor (40) when the stator (20) and the rotor (40) are assembled.

The motor (1) is configured such that a coil end (21E) of at least one coil (in the embodiment, the U-phase coil (21)) passes through the inner side relative to the inner peripheral surface of the stator core (30), and therefore, the coil end (21E) can be formed shorter than a coil end formed to be curved toward the outer peripheral surface of the stator core (30). Therefore, according to the motor (1), it is possible to prevent hitting between the coil ends (21E, 22E, 23E) and the rotor (40) when the stator (20) and the rotor (40) are assembled while shortening the coil ends (21E, 22E, 23E), thereby making it possible to reduce an electric resistance in the coil ends (21E, 22E, 23E) to prevent reduced efficiency of the motor (1) due to copper loss.

In the motor (1), a region located in the inner side relative to the inner peripheral surface of the stator core (30) is used as a region for arranging the coil ends (21E, 22E, 23E), thereby distributing, along the radial direction, the coil ends (21E, 22E, 23E) arranged in the same angle without laminating them along the axial direction. This can suppress the heights of the coil ends (21E, 22E, 23E) in the axial direction, and the use of the region located the inner side relative to the inner peripheral surface of the stator core (30), which could not conventionally be used, can prevent the coil ends (21E, 22E, 23E) from expanding toward the outer peripheral side, thereby making it possible to reduce the length of the stator core (30) in the radial direction. Therefore, the motor (1) is miniaturized, and the coil ends (21E, 22E, 23E) are further shortened, thereby making it possible to improve efficiency of the motor (1).

Furthermore, in the motor (1), both ends of at least one coil end (in the embodiment, the coil end (22E) of V-phase) of the coils (21, 22, 23) located in the axial end surface of the stator core (30) are connected together by the shortest distance, and is formed in a linear shape when viewed in plan. The coil end (22E) is formed with such a configuration, and therefore, the coil end (22E) can be further shortened to prevent reduced efficiency of the rotary electric machine due to copper loss. With such a configuration of the coil end (22E), even if the coil end (22E) passes through the inner side relative to the inner peripheral surface of the stator core (30), the stator core (30) is constituted by the three separated stator core parts (31) as stated above, and therefore, it is possible to prevent the coil end (22E) from hitting the rotor (40) when the stator (20) and the rotor (40) are assembled.

In the motor (1), the stator core (30) and the rotor core (41) are configured so as to form the gaps (three-dimensional gaps) between the both cores to be continuously arranged in a staggered manner along the radial direction and the axial direction, thereby making it possible to drastically increase where parts of the surfaces of the both cores (30, 41) face each other. This configuration can improve torque characteristics in the motor (1) to be able to improve the efficiency of the motor (1). As stated above, if the stator core (30) is provided with the raised/recessed portions (38), and the rotor core (41) is provided with the raised/recessed portions (46), the size of the motor (1) itself increases along the radial direction. However, as stated above, the use of the region located in the inner side relative to the inner peripheral surface of the stator core (30) prevents the coil ends (21E, 22E, 23E) from expanding toward the outer peripheral side, thereby making it possible to reduce the length of the stator core (30) in the radial direction. Therefore, the efficiency of the motor (1) can be improved without an increase of the size of the motor (1).

Other Embodiments

The above embodiment may have the following configurations.

The configuration of the respective coils (21, 22, 23) is not limited to the above embodiment. Any configurations may be employed as long as each of the coils (21, 22, 23) may be disposed so as not to lie astride any two of the three separated stator core parts (31).

In the above embodiment, the coil end (21E) of the U-phase coil (21) is disposed to pass through the inner side relative to the inner peripheral surface of the stator core (30). The coil end (22E) of the V-phase coil (22) or the coil end (23E) of the W-phase coil (23) may be configured to pass through the inner side relative to the inner peripheral surface of the stator core (30).

Figure 7:
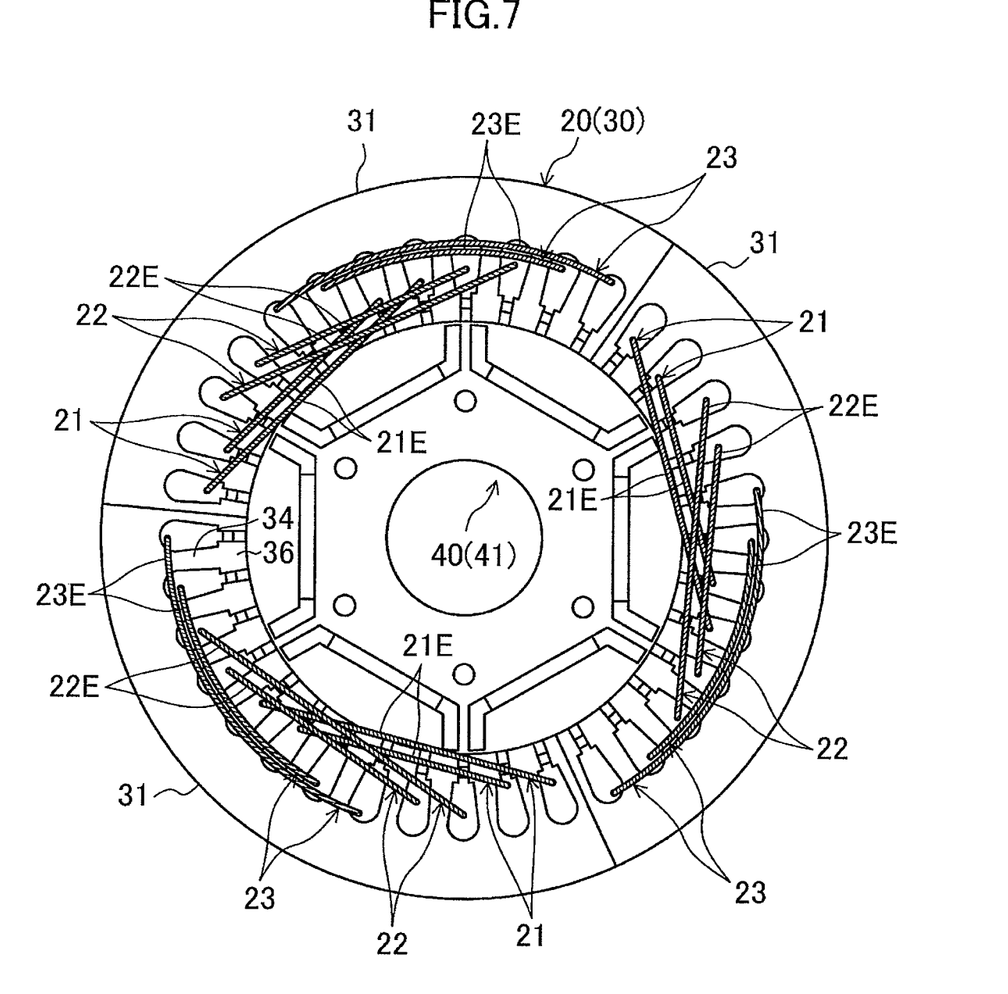
FIG. 7 is a plan view showing a structure of a motor in another embodiment.

In the above embodiment, only the coil end (22E) of the V-phase coil (22) is formed in a linear shape when viewed in plan. As shown in FIG. 7, the coil end (21E) of the U-phase coil (21) may be formed in a linear shape when viewed in plan, and furthermore, the coil end (23E) of the W-phase coil (23) may be formed in a linear shape when viewed in plan. Such a configuration can also shorten the respective coil ends (21E, 22E, 23E), thereby making it possible to reduce an electric resistance in the coil ends (21E, 22E, 23E) to prevent reduced efficiency of the motor (1) due to copper loss.

The size of the gap (G) in the above embodiment is an example, and the gap (G) may have a different size. The size of the gap (G) in the axial direction may be different from the size of the gap (G) in the radial direction.

In the above embodiment, each of the stator side raised/recessed portions (38) and the rotor side raised/recessed portions (46) is formed so as to have two raised portions (the first raised portion (38A, 46A) and the second raised portion (38B, 46B)), and the shapes of the raised/recessed portions (38, 46) are not limited to the above shapes. For example, each of the stator side raised/recessed portions (38) and the rotor side raised/recessed portions (46) may have only one raised portion, or may have three or more raised portions.

In the above embodiment, the motor (1) is described as an example of the rotary electric machine according to the present invention, and the rotary electric machine according to the present invention may be a generator including a stator (20) and a rotor (40) similar to those in the above embodiment.

The present invention is applicable to reluctance type rotary machines including a rotor (40) having no magnets.

The above-described embodiments have been set forth merely for the purposes of preferred examples in nature, and are not intended to limit the scope, applications, and use of the invention.

INDUSTRIAL APPLICABILITY

As described above, the present invention is useful for rotary electric machines, such as a motor having coils wound in a distributed winding manner, etc.

DESCRIPTION OF REFERENCE CHARACTERS

1 Motor (Rotary Electric Machine)
20 Stator
21, 22, 23 Coil
21e, 22e, 23e Coil End
30 Stator Core
31 Stator Core Part (Member)
38 Stator Side Raised/Recessed Portions (Raised/Recessed Portions)
40 Rotor
41 Rotor Core
46 Rotor Side Raised/Recessed Portions (Raised/Recessed Portions)
60 Driving Shaft
G Gap

The invention claimed is:

1. A method for assembling a rotary electric machine including
   a driving shaft,
   a rotor having a substantially cylindrical rotor core attached to the driving shaft, and
   a stator having:
      a substantially cylindrical stator core which is provided around the rotor, which includes a core back portion having a substantially cylindrical shape and a plurality of teeth radially inwardly protruding from the core back portion toward the driving shaft such that radially inner end surfaces of respective tips of the plurality of teeth form an inner peripheral surface of the stator core facing the rotor, the stator core being divided into a plurality of separated stator core parts aligned along a peripheral direction, and
      a plurality of coils wound around the stator core in a distributed winding manner,
   the method comprising:
   when the stator core parts are separated, attaching the coils to each of the plurality of separated stator core parts so that axial coil ends of at least one coil of the plurality of coils pass through a radially inner side relative to the inner peripheral surface, said attaching being performed such that none of the coils lie astride any two of the separated stator core parts, and; and
   assembling the stator and the rotor by radially inwardly moving the separated stator core parts having the corresponding coils attached thereto from an outer peripheral side of the rotor to installation positions.

2. The method of claim 1, wherein the coils are attached to each of the plurality of separated stator cores in such manner that, after the stator and the rotor are assembled, a distance between the coil ends and the driving shaft is smaller than the distance between a distance between the inner peripheral surface and the driving shaft.

3. The method of claim 1, wherein
   the rotary electric machine further includes a casing having a cylinder portion comprised of a plurality of parts aligned the peripheral direction and fixed to the respective stator core parts, and end plates closing both ends of the cylinder portion and rotatably supporting the driving shaft,
   each of the parts of the cylinder portion is fixed to a corresponding one of the stator core parts before each of the coils is attached to a corresponding one of the stator core parts,
   the driving shaft to which the rotor is fixed is rotatably attached to the end plates of the casing, and
   when the stator and the rotor are assembled, the stator core parts to which the parts of the cylinder portion are fixed and to which the coils are attached are radially inwardly moved from the outer peripheral side of the rotor to installation positions, and the parts of the cylinder portion fixed to the respective stator core parts are fixed to the end plates.

* * * * *